Dec. 15, 1942.   C. H. ZIMMERMAN   2,305,053
METHOD OF MAKING SAFETY TUBES
Filed June 28, 1940   2 Sheets-Sheet 1

Inventor
Charles H. Zimmerman
By
Attorney

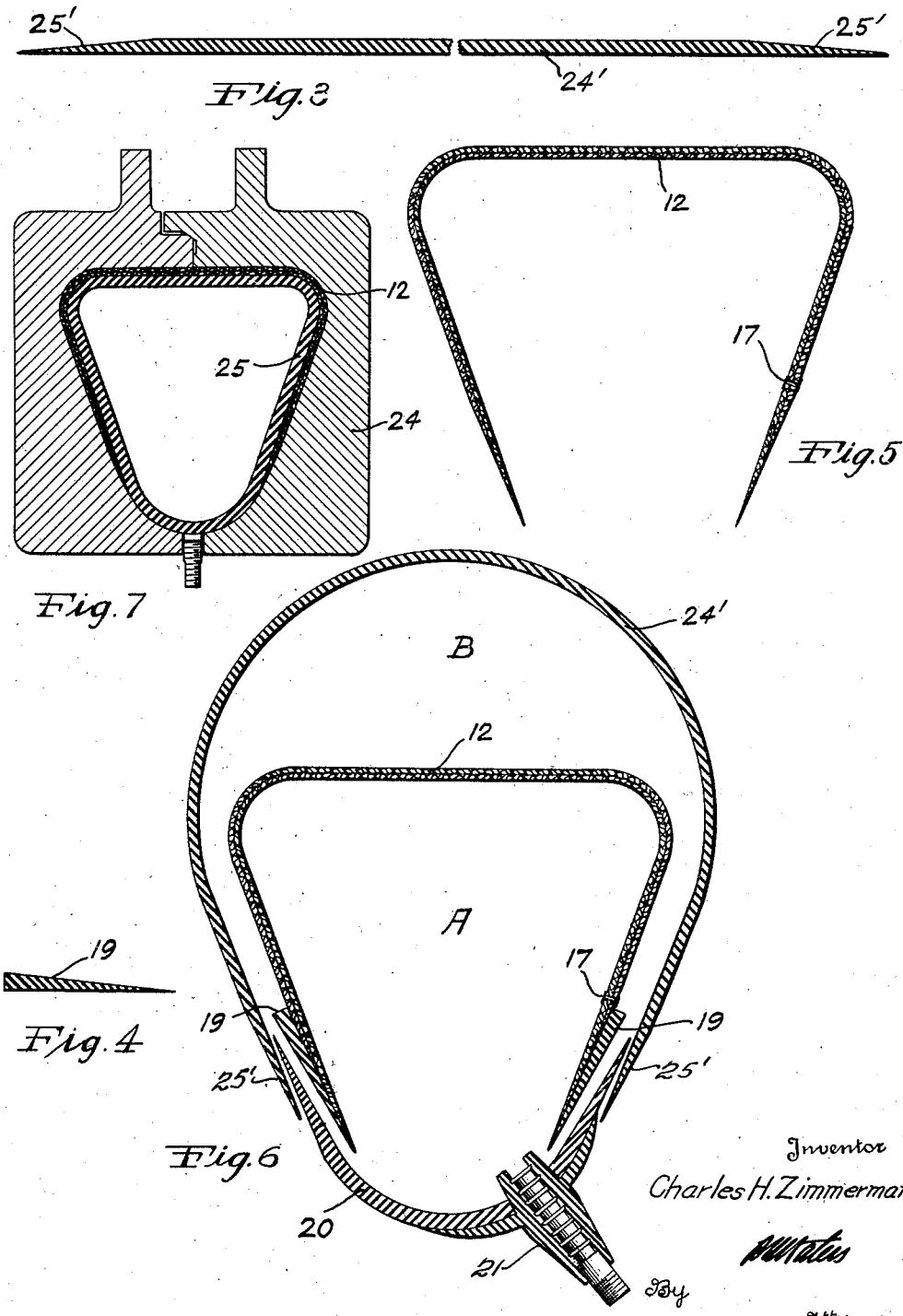

Patented Dec. 15, 1942

2,305,053

UNITED STATES PATENT OFFICE 2,305,053

METHOD OF MAKING SAFETY TUBES

Charles H. Zimmerman, Akron, Ohio, assignor to Wingfoot Corporation, Wilmington, Del., a corporation of Delaware Application June 28, 1940, Serial No. 342,972

14 Claims. (Cl. 154—14)

The present invention relates to safety tubes of the type disclosed in the patents to Lee Nos. 2,090,210 and 2,173,065 and is an improvement on the method disclosed in the first-mentioned patent for forming the tube.

An object of this invention is to provide a simplified method of manufacturing a plural-chambered tube of this type embodying certain features and advantages which will appear hereinafter as the description of the invention proceeds.

One object of this invention is to provide a method of forming such a tube using the air-bag method of forming at least a portion of the tube.

Another object of this invention is to provide a method of manufacturing a tube of this character which has certain economical advantages over prior-art methods for building such tubes.

Other objects of the invention will appear hereinafter as the description thereof proceeds, the novel features, arrangements and combinations being clearly set forth in the specification and in the claims thereunto appended.

In the drawings:

Fig. 3 is a cross-section through the flat band used to form the outer wall of the outer chamber of the tube;

Fig. 4 is a cross-section through one of the elements used in joining the tubes;

Fig. 5 is a cross-section illustrating the shape of a portion of the inner chamber wall after the vulcanization step performed therein;

Fig. 6 is a schematic diagram illustrating the position of the various parts with respect to each other in the final assembly of the tube, but with the parts spaced slightly from each other to indicate the different joints which are made to produce the finished tube; and Fig. 7 is a section illustrating one step in my improved method.

In the patent to Lee 2,090,210 there is described a safety tube having two chambers and a method of forming those plural chambers which requires that the inner tube be first formed completely and then inflated within a usual type of watch-case mold to cure the same in the manner that is customary in connection with ordinary inner tubes. The present method is an improvement on the method disclosed therein and one of the important changes in the method of manufacture is the employment of an air bag instead of the usual inflation method employed with inner tubes and described in the aforesaid patent to Lee 2,090,210.

Figure 1:
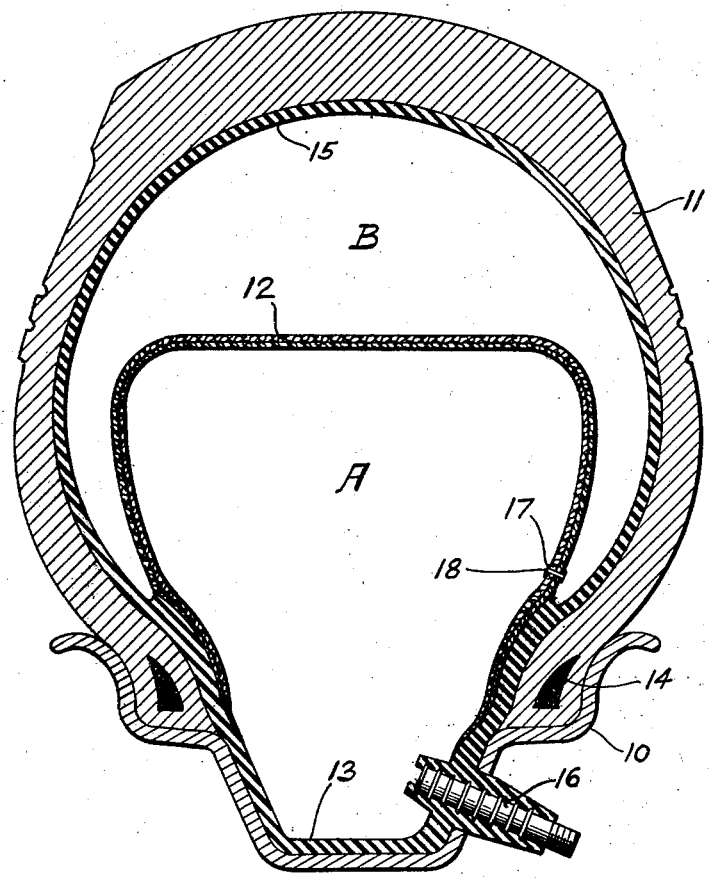
Fig. 1 is a cross-sectional view through a tube made according to this invention and mounted within a tire carried by a drop-center rim.

Referring now to Fig. 1 of the drawings, the numeral 10 indicates a drop-center rim on which is mounted a tire casing 11. The inner tube is formed with a plurality of chambers A and B. The inner chamber A comprises the U-shaped outer portion or wall 12 formed of several layers of fabric and a base 13 of rubber joined thereto. These are joined to each other adjacent the bead areas 14 of the tire.

The outer chamber B is connected to the base portion 13 at the edges thereof and has the outer wall 15 made of extensible material, such as stretchable rubber, adapted to contact with and conform to the inner wall of the tire. A valve 16 is provided in the base of the tube for inflating the inner chamber and a grommet 17 in the side wall of the chamber A is provided with a small opening 18 of approximately not over .05″ in diameter to allow the air to fill the outer chamber B from the air supplied to chamber A and to provide for the slow deflation of either chamber A or B upon failure of the other chamber, all as more thoroughly discussed in the aforesaid Lee patents.

In order to form the wall 12 of the inner tube, several layers of fabric are plied up, one on the other, and in the shape of a flat annular band, and then the inner section thereof is expanded to form a substantially U-shaped member such as illustrated in Fig. 5. The grommet 17 is then inserted within a hole formed in the side wall of 12 and this U-shaped member is then placed over an air bag 25 having a cross-section substantially the same as that of the U-shaped member which it is desired to form, and the assembled air bag 25 and wall 12 are then placed within a mold 24 and at least partially cured in the usual manner, thus giving a permanent shape to the wall 12 of the inner chamber.

In Fig. 6 this wall 12 is shown provided with rubber strips 19 placed on the outside of the wall adjacent its inner edges. This is preferably of uncured rubber stock which will adhere to the edges of the wall 12.

Figure 2:
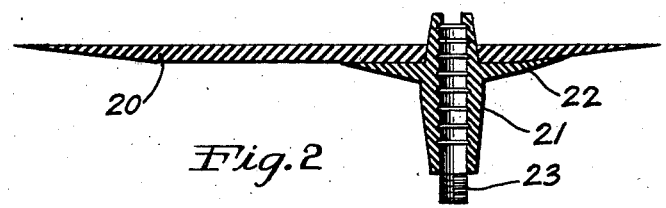
Fig. 2 is a cross-section through the band which is used to form the common base of the two chambers of the inner tube.

A base strip, preferably made of rubber or other material which is stretchable at least transversely, is illustrated at 20 in Fig. 2 and to this there is first applied a valve, such as 21, having a base 22 and stem 23. This band is shown in cross-section in Fig. 2 and after being formed as a flat band with the valve applied thereto it is shaped substantially to the form illustrated in Fig. 6 and the inner edges thereof are then pressed against the uncured rubber strips 19 to adhere the base 20 to the wall 12, thus forming the inner annular chamber A. A similar flat band 24' having tapered edges 25' is then given a U shape as illustrated in Fig. 6 by expanding the central portion thereof, after which this is made to encompass the wall 12 of the inner chamber A, and the edges 25' thereof are then superimposed in adhering relation to the outer edges of the base portion 20 and the outer surfaces of the strips 19 or the portions thereof which are exposed, if any. After the parts are so assembled they are then placed within a final curing mold in substantially the same manner as described in the aforesaid Patent 2,090,210, and cured by what is commonly known as the watch-case method of curing without an air bag. Since the wall of the inner chamber has already been preformed by at least a partial cure the shape thereof will not be changed during the final cure of the tube and when the tube is removed from the mold it is then ready to be placed within the tire casing after the usual inspection and certain minor finishing operations that are employed to complete the tube. During this stage of vulcanization the wall 12 receives its final cure.

Instead of forming the U-shaped member shown in Fig. 5 first as a flat band it may be built on a core to the shape illustrated and with the fabric so plied up layer upon layer as to give to the aforesaid U-shaped member non-stretchable characteristics at least in a longitudinal direction whereby centrifugal force will not affect its shape materially or cause the wall 12 of the inner chamber to expand into close proximity with the wall of the outer chamber.

Obviously those skilled in the art to which this invention pertains may make various changes in the construction and arrangement of the parts and in the method of assembling same without departing from the spirit of this invention and therefore I do not wish to be limited in my invention or in the method of forming the tube except as pointed out in the claims hereunto appended.

Having thus fully described my invention what I claim and desire to secure by Letters Patent of the United States is:

1. The method of forming safety tubes having two annular tubes, one smaller than the other in cross-sectional area and arranged in the other of said tubes, the tubes being joined at their inner peripheries in a common base, comprising the steps of forming an endless band of flexible stock as a substantially flat band, expanding said band centrally of its width to give same a substantially U-shaped cross-section open at its inner periphery, at least partially curing the band so formed, thereafter closing the open side of said band by a strip of flexible material to form a closed tube, and encompassing the first U-shaped band with a second tube secured to said first tube at its base.

2. The method of forming safety tubes having two annular tubes, one smaller than the other in cross-sectional area and arranged in the other of said tubes, the tubes being joined at their inner peripheries in a common base, comprising the steps of forming an endless band of flexible fabric as a substantially flat band, expanding said band centrally of its width to give same a substantially U-shaped cross-section open at its inner periphery, at least partially curing the band so formed, thereafter closing the open side of said band by a strip of flexible material to form a closed tube, and encompassing the first U-shaped band with a second tube secured to said first tube at its base.

3. The method of forming safety tubes having two annular tubes, one smaller than the other in cross-sectional area and arranged in the other of said tubes, the tubes being joined at their inner peripheries in a common base, comprising the steps of forming an endless band of flexible stock as a substantially flat band, expanding said band centrally of its width to give same a substantially U-shaped cross-section open at its inner periphery, at least partially curing the band so formed, adhering uncured rubber strips to the outer sides of the inner edges of said band, thereafter closing the open side of said band by a strip of flexible material and adhering it to said rubber strips to form a closed tube, forming a second U-shaped band of greater cross-section and outside diameter than said first band and encompassing the first U-shaped band with said second band and adhering the edges thereof of said inner tube.

4. The method of forming safety tubes having two annular tubes, one smaller than the other in cross-sectional area and arranged in the other of said tubes, the tubes being joined at their inner peripheries in a common base, comprising the steps of forming an endless band of flexible stock as a substantially flat band, expanding said band centrally of its width to give same a substantially U-shaped cross-section open at its inner periphery, at least partially curing the band so formed, thereafter closing the open side of said band by a strip of flexible material and adhering it to said rubber strips to form a closed tube, forming a second U-shaped band of greater cross-section and outside diameter than said first band, encompassing the first U-shaped band with said second band and adhering the inner edges of said second U-shaped member to said inner tube near its base.

5. The method of forming safety tubes having two annular tubes, one smaller than the other in cross-sectional area and arranged in the other of said tubes, the tubes being joined at their inner peripheries in a common base, comprising the steps of forming an endless band of flexible stock as a substantially flat band, expanding said band centrally of its width to give same a substantially U-shaped cross-section open at its inner periphery, at least partially curing the band so formed, thereafter closing the open side of said band by a strip of flexible material and adhering it to said rubber strips to form a closed tube, forming a second U-shaped band of greater cross-section and outside diameter than said first band, encompassing the first U-shaped band with said second band, adhering the inner edges of said second U-shaped member to said inner tube near its base and vulcanizing said completed tube.

6. The method of forming safety tubes having two annular tubes, one smaller than the other in cross-sectional area and arranged in the other of said tubes, the tubes being joined at their inner peripheries in a common base, comprising the steps of forming an endless band of flexible stock as a substantially flat band, expanding said band centrally of its width to give same a substantially U-shaped cross-section open at its inner periphery, at least partially curing the band so formed, adhering uncured rubber strips to the outer sides of the inner edges of said band, thereafter closing the open side of said band by a strip of flexible material and adhering it to said rubber strips to form a closed tube, forming a second U-shaped band of greater cross-section and outside diameter than said first band, encompassing the first U-shaped band with said second band, adhering the inner edges of said second U-shaped member to said inner tube near its base and vulcanizing said completed tube.

7. The method of forming safety tubes having two annular tubes, one smaller than the other in cross-sectional area and arranged in the other of said tubes, the tubes being joined at their inner peripheries in a common base, comprising the steps of forming an endless band of flexible fabric as a substantially flat band, expanding said band centrally of its width to give same a substantially U-shaped cross-section open at its inner periphery, at least partially curing the band so formed, adhering uncured rubber strips to the outer sides of the inner edges of said band, thereafter closing the open side of said band by a strip of flexible rubber to form a closed tube, forming a second U-shaped band of greater cross-section and outside diameter than said first band, encompassing the first U-shaped band with said second band, adhering the inner edges of said second U-shaped member to said inner tube near its base and vulcanizing said completed tube.

8. The method of forming safety tubes having two annular tubes, one smaller than the other in cross-sectional area and arranged in the other of said tubes, the tubes being joined at their inner peripheries in a common base, comprising the steps of forming an endless band of flexible fabric as a substantially flat band, expanding said band centrally of its width to give same a substantially U-shaped cross-section open at its inner periphery, at least partially curing the band so formed, thereafter closing the open side of said band by a strip of flexible rubber to form a closed tube, forming a second U-shaped band of greater cross-section and outside diameter than said first band, encompassing the first U-shaped band with said second band, adhering the inner edges of said second U-shaped member to said inner tube near its base and vulcanizing said completed tube.

9. The method of forming safety tubes having two annular tubes, one smaller than the other in cross-sectional area and arranged in the other of said tubes, the tubes being joined at their inner peripheries in a common base, comprising the steps of forming an endless band of flexible stock as a substantially flat band, expanding said band centrally of its width to give same a substantially U-shaped cross-section open at its inner periphery, at least partially curing the band so formed on an air bag within a mold, thereafter closing the open side of said band by a strip of flexible material to form a closed tube, encompassing the first U-shaped band with a second tube and securing it thereto at its base, adhering the inner edges of said second U-shaped member to said inner tube near its base, and vulcanizing said completed tube.

10. The method of forming safety tubes having two annular tubes, one smaller than the other in cross-sectional area and arranged in the other of said tubes, the tubes being joined at their inner peripheries in a common base, comprising the steps of forming an endless band of flexible fabric as a substantially flat band, expanding said band centrally of its width to give same a substantially U-shaped cross-section open at its inner periphery, at least partially curing the band so formed on an air bag and within a mold, adhering uncured rubber strips to the outer sides of the inner edges of said band, thereafter closing the open side of said band by a strip of flexible rubber to form a closed tube, forming a second U-shaped band of greater cross-section and outside diameter than said first band, encompassing the first U-shaped band with said second band, adhering the inner edges of said second U-shaped member to said inner tube near its base and vulcanizing said completed tube.

11. The method of forming safety tubes having two annular tubes, one smaller than the other and arranged within the other of said tubes, the tubes being joined at their inner peripheries, comprising the steps of forming a substantially U-shaped annular band with the open side extending inwardly, at least partially vulcanizing said band on an air bag within a mold to cause said band to maintain its shape, thereafter closing the open side of said band by a strip of flexible material to form a complete annular tube, forming a second tube about the first tube and joining it to said first tube at its inner periphery to form a plural-chambered tube joined at a common base.

12. In the manufacture of safety inner tubes comprising concentric radially inner and outer circumferential chambers separated by a diaphragm, the method which comprises forming the diaphragm as an endless band of substantially U-shaped cross-section, at least partially vulcanizing the band so formed, providing two pieces of unvulcanized rubber stock adapted mutually to enclose said band, joining the edges of the diaphragm band to the edges of said two pieces of unvulcanized rubber stock, and then vulcanizing the so-assembled parts into a unitary structure.

13. In the manufacture of safety inner tubes comprising concentric radially inner and outer circumferential chambers separated by a diaphragm, the method which comprises forming the diaphragm as an endless band of substantially U-shaped cross-section, at least partially vulcanizing the band so formed, providing an enveloping band of unvulcanized rubber stock adapted to enclose said diaphragm, joining the edges of the diaphragm band to said enveloping band whereby the diaphragm becomes enclosed within the unvulcanized rubber stock, and then vulcanizing the so-assembled parts into a unitary structure.

14. In the manufacture of safety inner tubes comprising concentric radially inner and outer circumferential chambers separated by a diaphragm, the method which comprises forming the diaphragm as an endless band of substantially U-shaped cross-section, providing an enveloping band of unvulcanized rubber stock adapted to enclose said diaphragm, joining the edges of the diaphragm band to said enveloping band whereby the diaphragm becomes enclosed within the unvulcanized rubber stock, and then vulcanizing the so-assembled parts into a unitary structure.

CHARLES H. ZIMMERMAN.